United States Patent [19]

Mosterd

[11] 4,049,111
[45] Sept. 20, 1977

[54] DEVICE FOR CONVEYING EGGS

[75] Inventor: Jacob Hendrik Mosterd, Barneveld, Netherlands

[73] Assignee: Moba Holding Barneveld B.V., Barneveld, Netherlands

[21] Appl. No.: 598,422

[22] Filed: July 23, 1975

[30] Foreign Application Priority Data

Aug. 8, 1974 Netherlands .................. 7410666

[51] Int. Cl.² .............................................. B65G 47/26
[52] U.S. Cl. .................................. 198/445; 198/734
[58] Field of Search ................ 198/30, 288, 247, 255, 198/256, 168, 170, 445, 734

[56] References Cited

U.S. PATENT DOCUMENTS

| 3,311,216 | 3/1967 | Jones | 198/30 |
| 3,871,515 | 3/1975 | Randrup | 198/287 |

FOREIGN PATENT DOCUMENTS

| 2,247,989 | 4/1974 | Germany | 198/734 |
| 1,194,325 | 6/1965 | Germany | 198/170 |

Primary Examiner—Evon C. Blunk
Assistant Examiner—Douglas D. Watts
Attorney, Agent, or Firm—Larson, Taylor and Hinds

[57] ABSTRACT

The invention provides a device for transporting eggs from a broad conveyor belt, on which the eggs may be positioned randomly, towards a discharge device having a number of juxtapositioned discharge locations, each adapted to discharge one egg at a time, said device for transporting eggs containing a number of juxtapositioned gutters each having slightly tilting sidewalls and a central slot, yielding push members protruding upwardly through said slots, said members being moved in the longitudinal direction of said slots.

9 Claims, 7 Drawing Figures

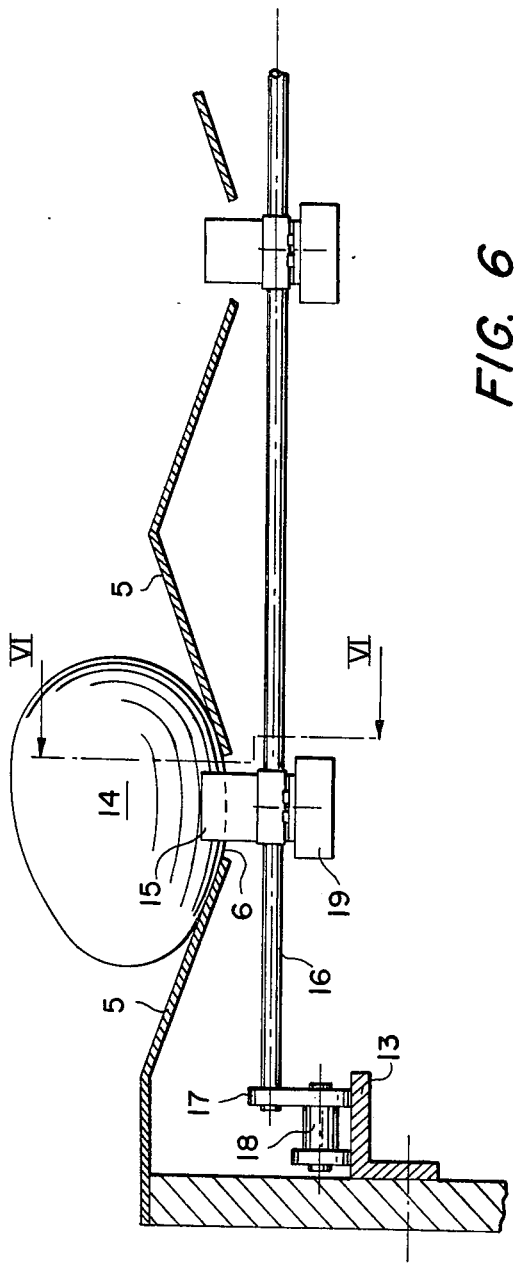
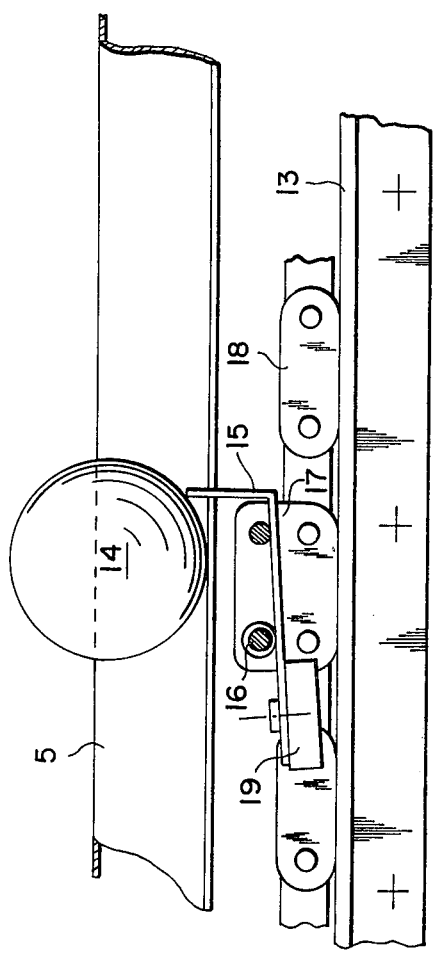

DEVICE FOR CONVEYING EGGS

The invention relates to a device for conveying eggs, provided with a broad conveyor, on which a number of eggs can be randomly positioned, and with a discharge device, having a number of juxtaposited discharge locations.

With a known device of this type use is made of a number of conveying members, which by means of notches everytime form pairwise a row of nests for the objects. Herewith a serious difficulty is to safeguard that the objects indeed all come into the nests. A further difficulty is that with such a device having a closed conveying surface each breakage of an egg requires almost immediate action to clean said surface in order to prevent serious soiling of other eggs and sticking of eggs in the contents of the broken egg. With such devices it has proven to be difficult to combine the following requirements:

a. little or no breakage of eggs;
b. little breakdown time if nevertheless breakage occurs;
c. allowance of stowage of a considerable quantity of eggs due to irregular feed and regular discharge;
d. a high machine speed.

The invention aims at providing a simple device, which removes the above mentioned difficulties, or at least considerably reduces them and complies with the above requirements. Accordingly, the invention is characterized by a number of mutually parallel gutters, located between the broad conveyer and the discharge device, each gutter having slightly tilting sidewalls and a slot in the central portion between the sidewalls, push members protruding through said slots, and means for moving said push members longitudinally through said slots in the direction from the broad conveyor towards the discharge device.

It is remarked that push members for eggs are known per se in a device for orientating eggs, with a support surface for the eggs moving with respect to said push members. These push members, however, are located completely above said support surface, such that when the eggs are not supplied between two push members, breakage can occur.

According to a further elaboration of the invention the push members consist of freely rotating circular members having their axis of rotation positioned perpendicular to a vertical plane passing through the midline of said slots. It has been proven that the latter sufficiently push the eggs forward, also when they are not orientated with their longitudinal axis transverse to the longitudinal direction of the gutter. When with this embodiment of the invention an egg engages a preceding egg, it jumps over such a roller or wheel and will not cause breakage.

According to another elaboration of the invention the push members can be yieldably mounted, with which they can be under the influence of a counterweight, can be executed as brushes, etc..

It has been proven that with the invention it is favourable when the means for moving the push members are adapted to move the push members at a greater velocity than corresponds to the discharge velocity of the discharge device.

The device according to the invention in particular is useful in egg handling devices, in which eggs at random positioned on a broad belt are conveyed and have to be discharged orientated on a roller chain.

Accordingly the further elaboration of the invention provides, that the broad conveyor is a rough conveyor belt with separation members provided at the discharge end thereof, such that a number of juxtapositioned conveyor paths is formed, each of the said gutters being in line with one of the conveyor paths, said discharge device being a roller chain adapted to receive one egg between two adjacent rollers. It has been proven, that also when a certain stowage of eggs occurs in one of the gutters the roller chain takes over only one egg between each two rollers, and that with said taking over the eggs will come to lie always sufficiently with their longitudinal axis transverse to the direction of conveyance for a stable position on the roller chain.

The invention is in the following further elucidated with reference to the drawings, in which.

Figure 1:
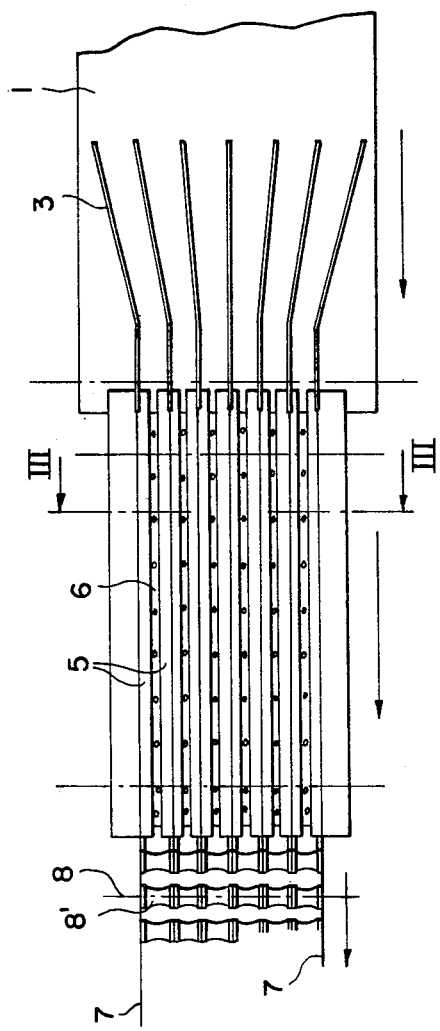
FIG. 1 shows a top view of an embodiment of the invention.
Figure 3:
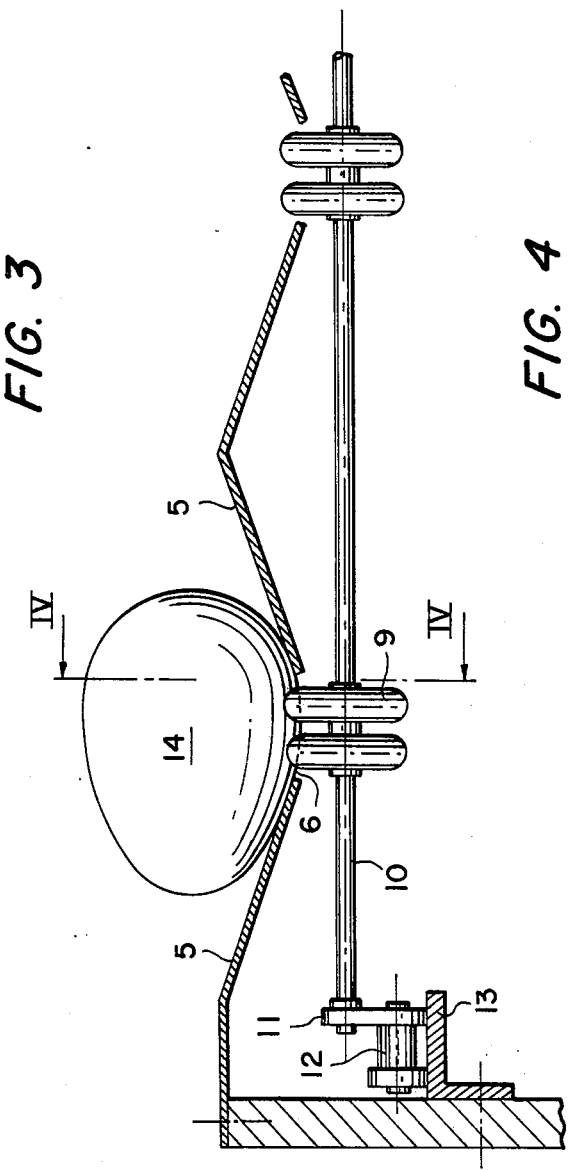
Figure 4:
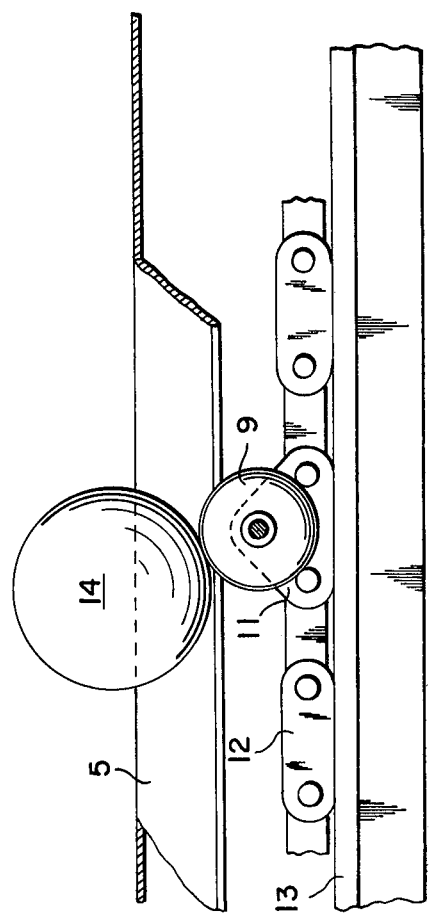

FIG. 3 on an enlarged scale shows a cross-sectional view taken along the line III—III of FIG. 1;

FIG. 4 is a section, taken along the line IV-IV of FIG. 3;

FIG. 5 corresponds with FIG. 3, but shows another embodiment of the invention; and FIG. 6 is a section along the line VI—VI of FIG. 5.

Figure 7:
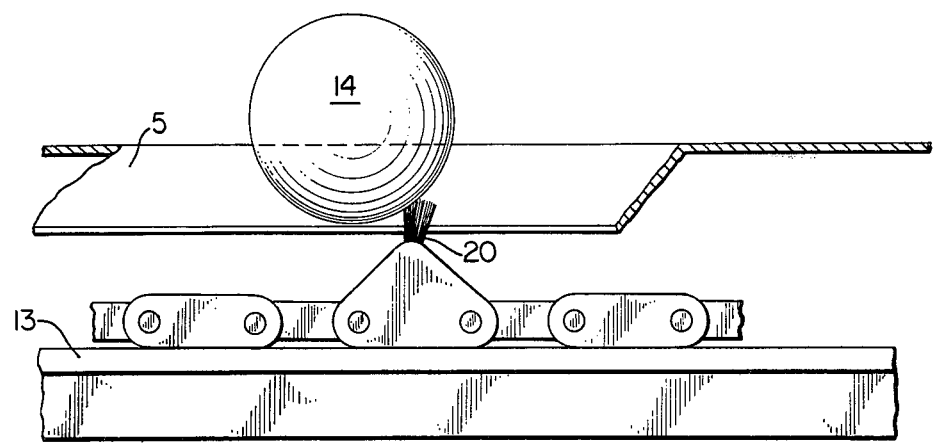

FIG. 7 is a sectional view of a further embodiment, using protruding brushes.

The device according to FIG. 1 comprises a broad conveyor belt 1, e.g. of a woven metal band. Said conveyor belt 1 runs over horizontal rollers, one of which, i.e. 2, is indicated. Said belt 1 is driven in the direction of the arrow shown in FIG. 1. Above the discharge end of the conveyor belt 1 a number of separating members 3 is present, between which conveyor paths are located, which are mutually parallel at the discharge end of the belt 1. At the discharge end of said paths a number of gutters 4 are provided, each being formed by a pair of slightly tilting side planes 5 (angle of inclination relative to the horizontal preferably in the order of 20°) and therebetween a slot 6.

Figure 2:
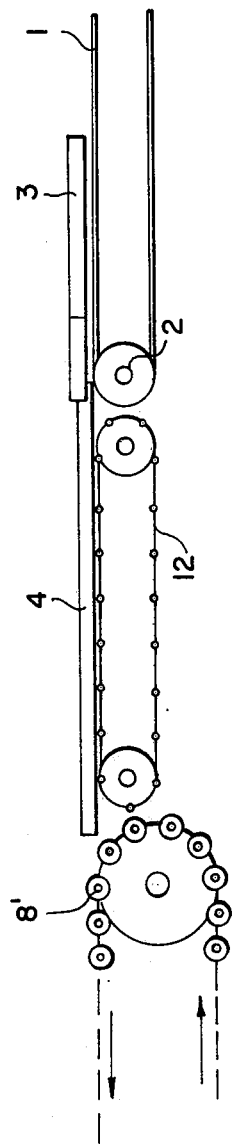
FIG. 2 is a vertical section through the device of FIG. 1.

At the discharge end of said gutters a roller chain which is known in itself is provided, each roller having a portion with a minimum diameter above the longitudinal midplane of each slot 6. Said roller chain comprises two chains 7 with shafts 8, on which rollers 8' are provided, said rollers preferably being rotated about their shafts 8, as known in itself, when chains 7 move in the direction of the arrows shown in FIG. 2. As in particular appears from FIGS. 3 through 6, push members protrude through slots 6, said push members being in the embodiment of FIGS. 3 and 4 freely rotating rollers. Said rollers 9 are mounted on a shaft 10, which is mounted to a link 11 of a conveyor chain 12, which runs in a way known in itself over a supporting plane 13. When, as indicated in FIG. 4, the rollers 9 hit an egg 14, said egg rolls through the gutter, with which the rollers 9 rotate also. If, however, an egg attains another orientation, hence not with the axis of the egg perpendicular to the direction of conveyance, the rollers still are active to shift the egg forward. When the egg engages a preceding egg, it is lifted for a while by the rollers 9 which in practice will not give rise to any difficulties. In practice the rollers protrude upward only a little bit through slot 6, e.g. about 2 mms.

In FIGS. 5 and 6 an embodiment is shown, in which a push member is formed by an angle lever 15, which can pivot about a shaft 16, which is mounted to a link 17 of a conveyor chain 18. The angle lever 15 has a horizontal portion to the left end of which (FIG. 6) a counterweight 19 is mounted, the other end being bent upwards and protruding through slot 6. Such push members, too, have proven to shift the eggs well forward, but when an egg engages an egg preceding it, the related push member tilts about its shaft 16 and the counterweight 19 is lifted for a little while.

Another embodiment of the push members, which works satisfactorily, is formed by protruding brushes 20. Said brushes must be sufficiently stiff to take along an egg under normal conditions, but must be resilient when an egg hits an egg preceding it.

Because the eggs are located centrally above the slots 6, when breakage occurs the contents of the broken egg will drip down and hardly soil the gutter itself. This normally means that it is not necessary to immediately stop the machine for cleaning purposes.

With the invention and especially the embodiment in which the travel speed of the push members is greater than corresponds to the discharge capacity of the discharge device, breakage of eggs is strongly reduced. The reason herefor is probably, that it is inevitable that the feed of eggs to each of the gutters is somewhat irregular. Because with the invention some stowage is allowed near the discharge end of the gutters the invention is favourable in preventing stowage at the entrance side of the gutters. This stowage in the individual gutters is better controlled than any stowage before the entrance of the gutters. This may be an explanation why with the invention very little breakage occurs.

I claim:

1. A device for conveying eggs, comprising a broad conveyor on which a number of eggs can be randomly positioned, a discharge device having a number of juxtapositioned discharge locations, and a number of generally horizontal mutually parallel gutters located between the broad conveyor and the discharge device, each gutter having slightly tilting sidewalls and a slot in the central portion between the sidewalls, push members protruding only slightly through said slots, and means for moving said push members longitudinally through said slots relative to the gutter sidewalls in the direction from the broad conveyor towards the discharge device, said push members comprising freely rotatable circular members for passing beneath an obstructed egg in said gutters without injuring the egg, but pushing unobstructed eggs along said gutters, whereby obstructed eggs caused by irregular feed to or discharge from said gutters may be temporarily stowed along any of said gutters without breakage.

2. A device according to claim 1, characterized in that the freely rotating circular members have their axis of rotation positioned perpendicular to a vertical plane passing through the midline of said slots.

3. A device according to claim 1, characterized in that the means for moving the push members are constructed and arranged to move the push members at a greater velocity then corresponds to the discharge velocity of the discharge device.

4. A device according to claim 1, characterized in that the broad conveyor is a rough conveyor belt with separation members provided at the discharge end thereof, such that a number of juxtapositioned conveyor paths is formed, each of the said gutters being in line with one of the conveyor paths, said discharge device being a roller chain adapted to receive one egg between two adjacent rollers.

5. A device according to claim 1 wherein the included angle between the sidewalls of each gutter is about 140°.

6. A device as claimed in claim 1 wherein said push members protrude through said slots by about two millimeters.

7. A device for conveying eggs, comprising a broad conveyor on which a number of eggs can be randomly positioned, a discharge device having a number of juxtapositioned discharge locations, and a number of generally horizontal mutually parallel gutters located between the broad conveyor and the discharge device, each gutter having slightly tilting sidewalls and a slot in the central portion between the sidewalls, push members protruding only slightly through said slots, and means for moving said push members longitudinally through said slots relative to the gutter sidewalls in the direction from the broad conveyor toward the discharge device, said push members comprising yieldably mounted members mounted for movement between an egg pushing position and an egg clearing position, and means yieldably biasing said members generally upwardly into their slightly protruding, egg pushing position, such that said push members pass beneath an obstructed egg in said gutters without injuring the egg, but push unobstructed eggs along said gutters, whereby obstructed eggs may be temporarily stowed along any of said gutters without breakage.

8. A device according to claim 7, characterized in that the push members are mounted pivotably about a horizontal axis and are provided with a counterweight, by which they are biased in an upward direction.

9. A device for conveying eggs, comprising a broad conveyor on which a number of eggs can be randomly positioned, a discharge device having a number of juxtapositioned discharge locations, and a number of mutually parallel gutters located between the broad conveyor and the discharge device, each gutter having slightly tilting sidewalls and a slot in the central portion between the sidewalls, push members protruding through said slots, and means for moving said push members longitudinally through said slots relative to the gutter sidewalls in the direction from the broad conveyor toward the discharge device, said push members comprising brushes so constructed and arranged as to pass beneath an obstructed egg in said gutters without injuring the egg, but to push unobstructed eggs along said gutters, at least the pushing surfaces of the brush push members being continually yieldable relative to obstructed eggs.

* * * * *